US006598152B1

(12) United States Patent
Sinharoy

(10) Patent No.: US 6,598,152 B1
(45) Date of Patent: Jul. 22, 2003

(54) INCREASING THE OVERALL PREDICTION ACCURACY FOR MULTI-CYCLE BRANCH PREDICTION AND APPARATUS BY ENABLING QUICK RECOVERY

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,264

(22) Filed: Nov. 8, 1999

(51) Int. Cl.$^7$ ................................................. G06F 9/38
(52) U.S. Cl. ........................ 712/228; 712/239; 712/240; 712/218; 712/215
(58) Field of Search ................................ 712/228, 239, 712/240, 218, 215

(56) References Cited

U.S. PATENT DOCUMENTS 5,805,878 A * 9/1998 Rahman et al. .............. 712/239
5,918,046 A * 6/1999 Hoyt et al. ................... 712/239

OTHER PUBLICATIONS

Tamir, Yuval, Marc Tremblay, and David A. Rennels, The Implementation and Application of Micro Rollback in Fault-Tolerant VLSI Systems, IEEE, 188, pp. 234–239.*

* cited by examiner

Primary Examiner—Richard L. Ellis
Assistant Examiner—Tonia Meonske
(74) Attorney, Agent, or Firm—Floyd A. Gonzalez; Marc A. Ehrlich; Bernard M. Goldman

(57) ABSTRACT

Enables a processor to quickly recover reliable use of a multi-cycle index used in a branch prediction mechanism for certain types of flush events occurring in the processor pipeline, whether the flush event occurs for a non-branch instruction or for a branch instruction contained in the same dispatch group. A GHV (global history vector) value is used in the generation of a multi-cycle index required for locating a prediction in a GBHT (global branch history table) for the instruction associated with the GHV value. The GHV value is captured in a BIQ (branch information queue) element representing each branch instruction selected for execution of a program. The BIQ element also captures an associated GHV count when the GHV value is captured. Recovery involves quickly restoring a GHV register to the captured GHV value when the GHV count captured in the same BIQ element has at least the value of N where N is the number contiguous fetch cycles without interruption required for the development of a steady state multi-cycle index value used in locating branch predictions in a global branch history table.

9 Claims, 15 Drawing Sheets

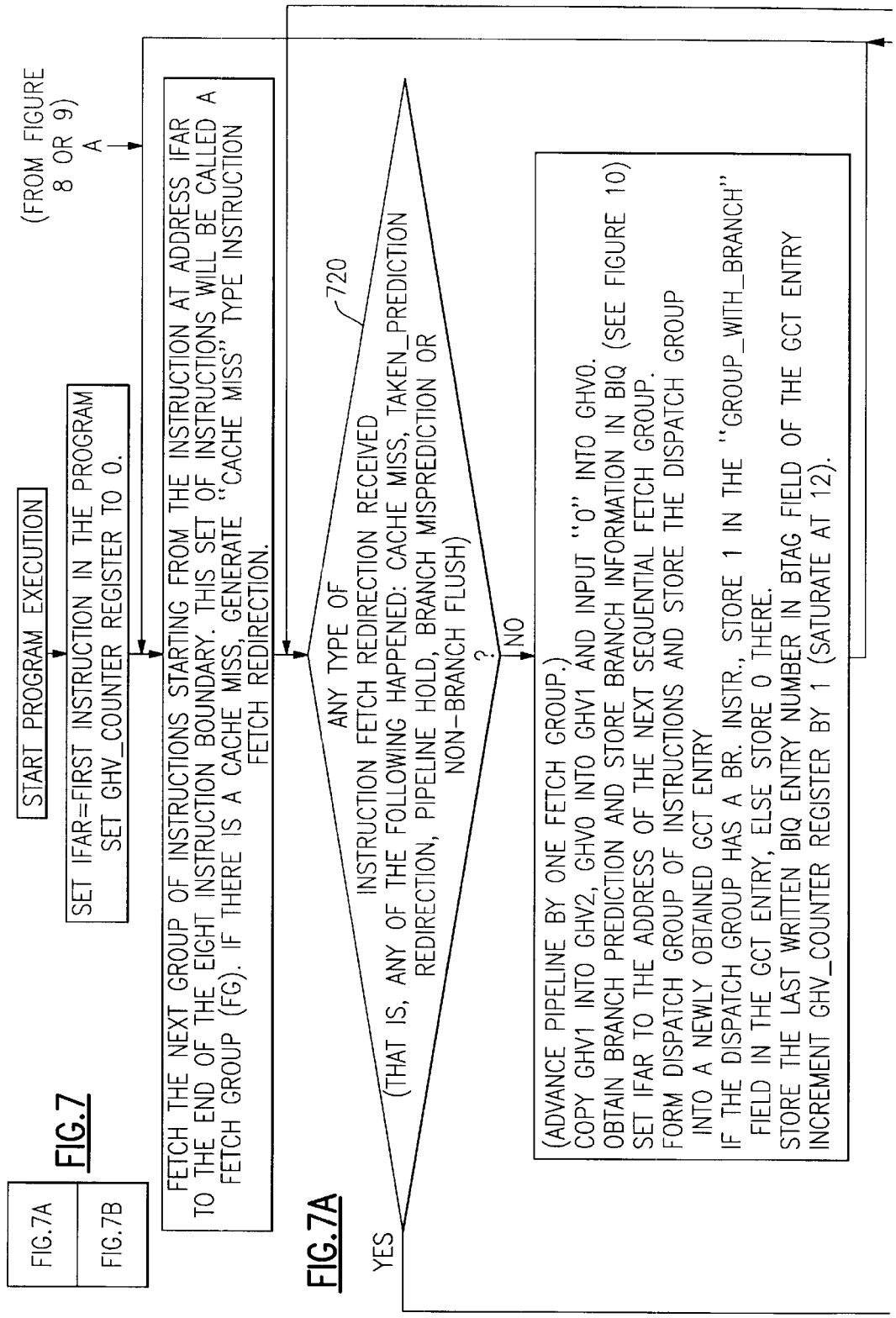

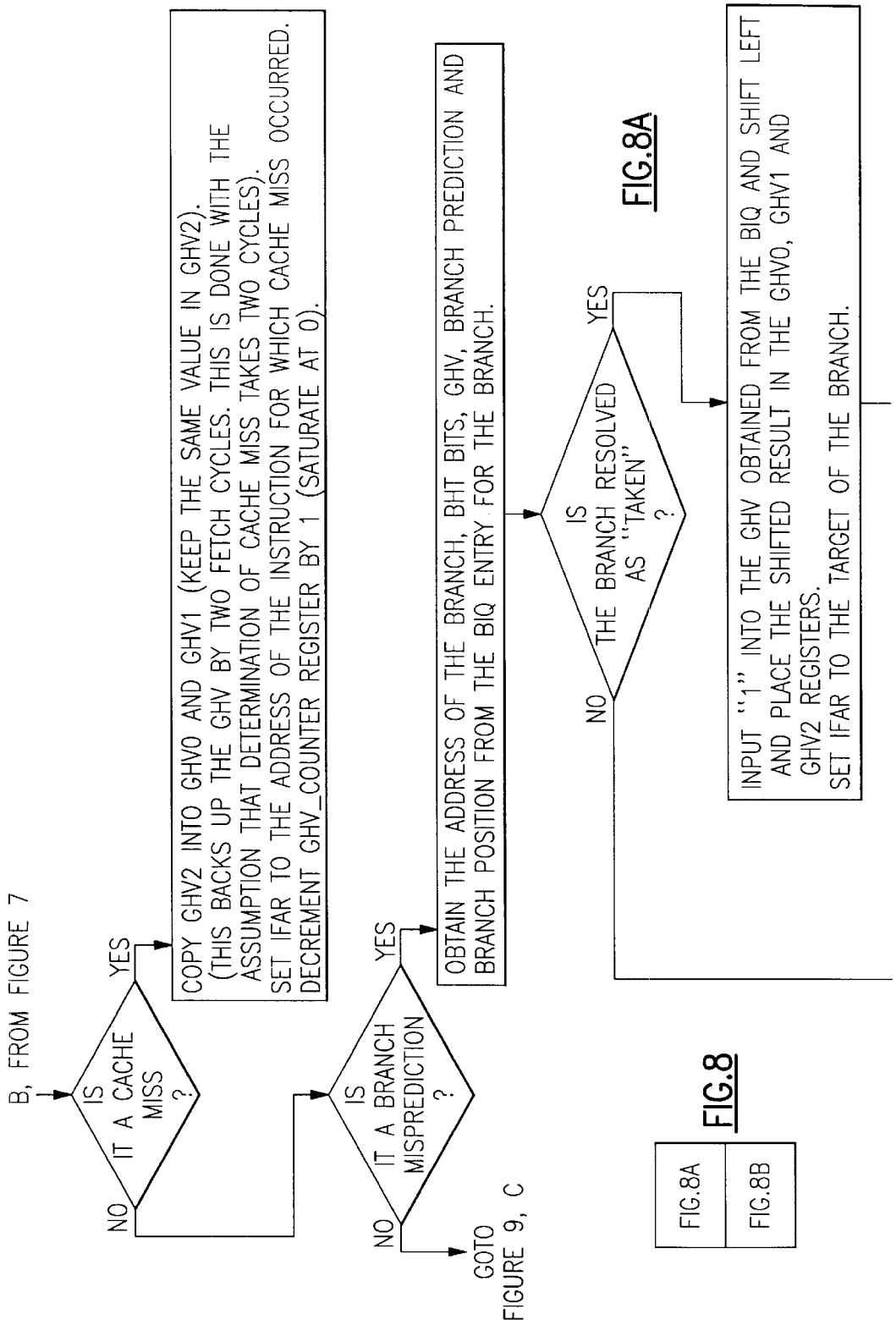

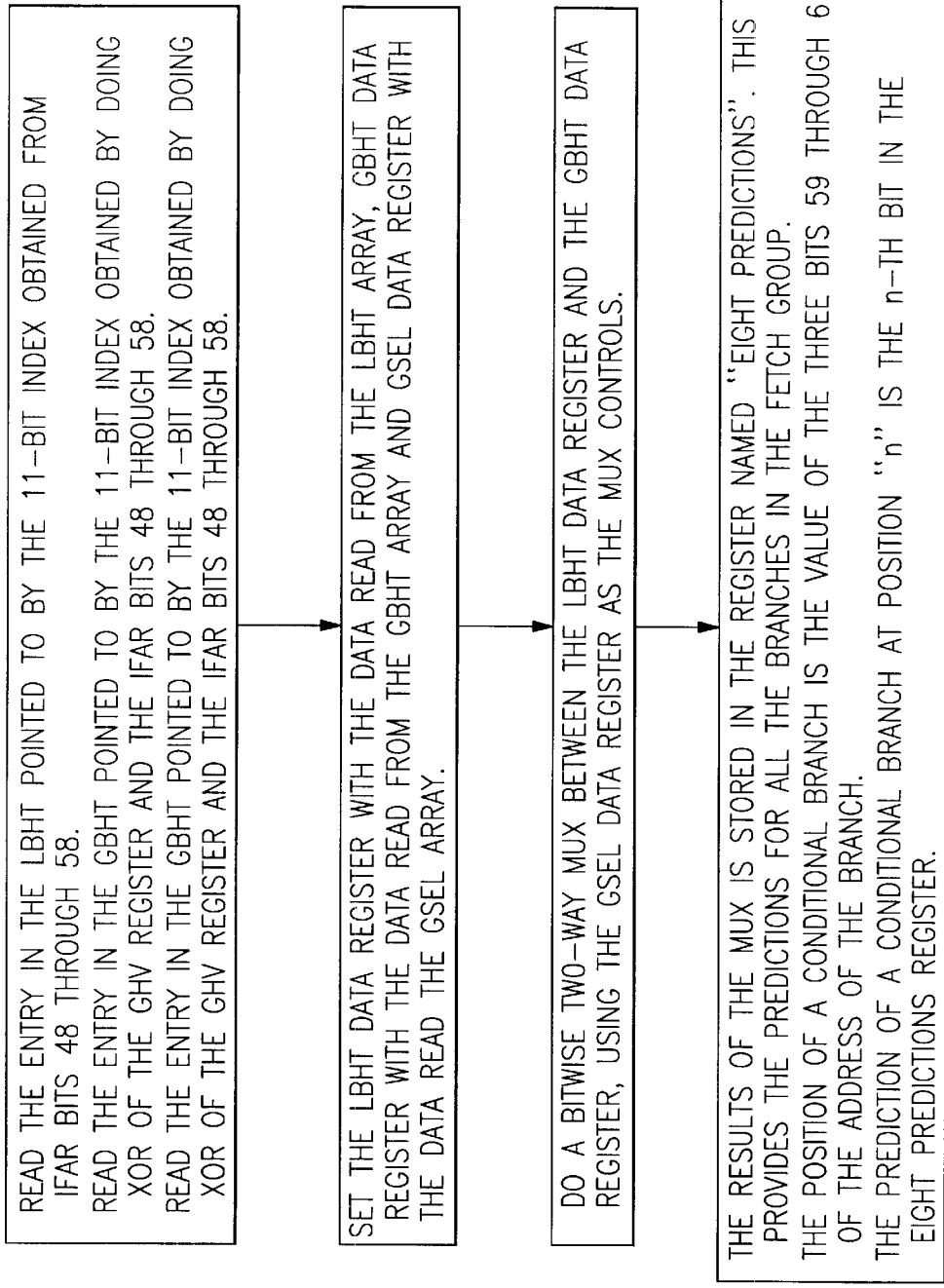

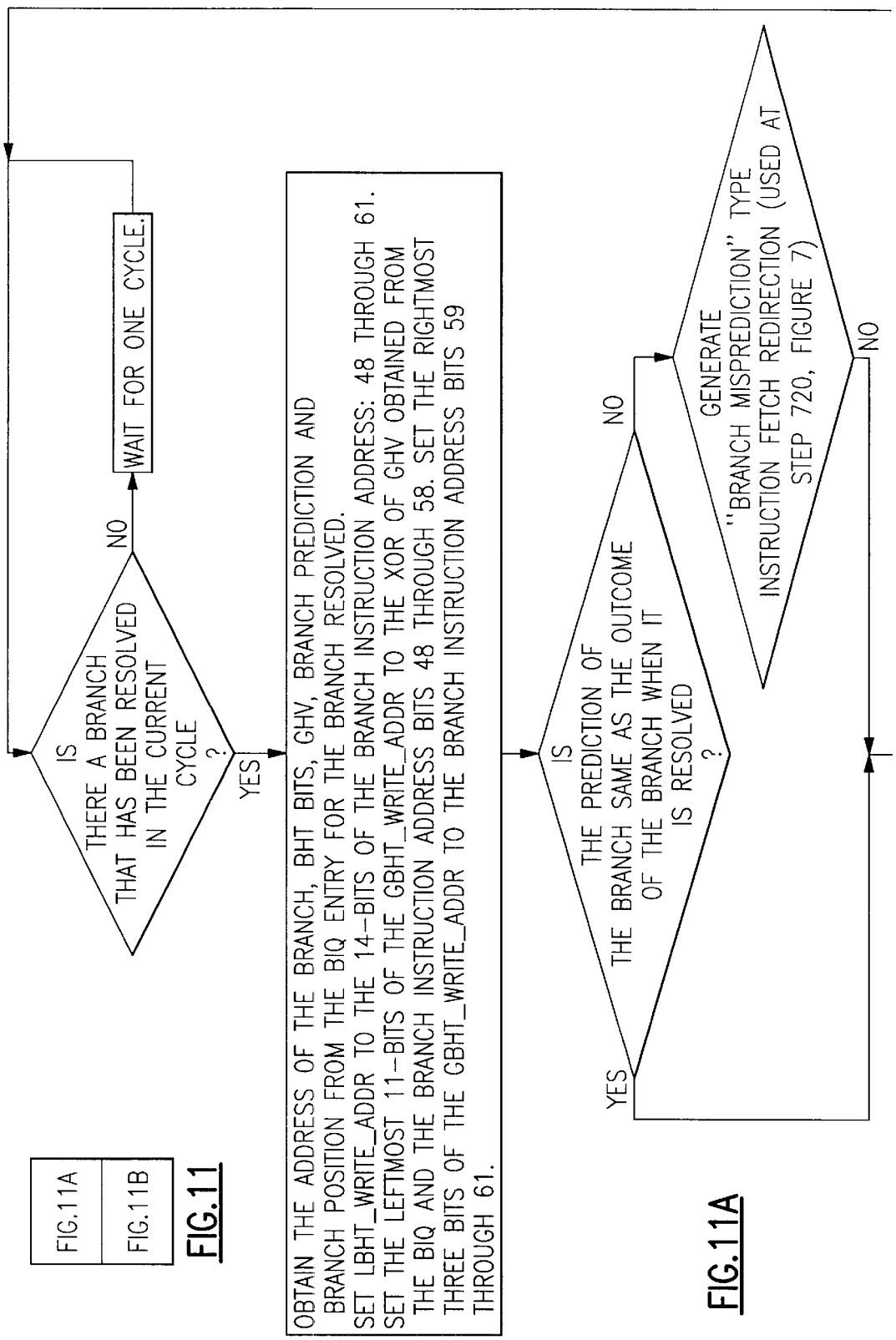

INCREASING THE OVERALL PREDICTION ACCURACY FOR MULTI-CYCLE BRANCH PREDICTION AND APPARATUS BY ENABLING QUICK RECOVERY

CROSS-REFERENCE TO RELATED APPLICATION

The present invention is related to U.S. patent application Ser. No. 09/435,554 entitled "Branch Prediction Apparatus and Process using a Single-Ported Branch History Table" filed on the same day as the subject application and invented by the inventor of the present application.

INCORPORATION BY REFERENCE

Incorporated by reference herein is the entire specification, including all text disclosure and all drawings, of application having U.S. Ser. No. 09/435,070 filed on Nov. 4, 1999 entitled "Circuits, Systems and Methods for Performing Branch Predictions by Selectively Accessing Bimodal and Fetch-Based Branch History Tables" by the inventor of the present application.

This invention generally deals with a novel process and a novel combination of apparatus in a processor chip for increasing the accuracy of branch prediction in the operation of a processor. More specifically, the present invention deals with the issue of increasing the speed of enablement for certain kinds of branch prediction tables in a processor semiconductor chip after a flush of instruction executions occurs in a processor pipeline.

BACKGROUND

The embodiment in the incorporated specification discloses an instruction prediction mechanism for use in a semiconductor chip which includes multiple types of prediction mechanisms, and controls for selecting among them for picking the prediction mechanism most likely to make the most accurate speculative prediction. A significant increase is thereby obtained in the processor overall speed of execution Particular types of branch prediction mechanisms disclosed therein, in which each selection is made include: a bimodal branch history table (LBHT), a fetch-based branch history table (GBHT), and a selector table (GSEL).

The invention in the related application teaches how a single-ported array can be used for a branch history table in which mispredictions are corrected during a stolen write cycle when the misprediction is detected during actual execution of the conditional branch instruction having the misprediction.

SUMMARY OF THE INVENTION

The subject invention is used to increase the speed of recovery of normal operation of instruction prediction mechanisms using multi-cycle indexing controls from disruptions caused by flushes in an execution pipeline caused during non-branch instructions execution. IFAR (instruction fetch address register) is used to locate an instruction, and a multi-cycle index is used to locate its associated prediction in particular types of instruction prediction mechanisms in which each index is developed over the last C number of fetch cycles.

In the incorporated application, a fetch-based GBHT (global branch history table) is disclosed which uses the IFAR to locate an I-cache instruction and a multi-cycle index developed over the last N fetch cycles to locate each I-cache instruction and its associated prediction required for a program execution. When an adverse event occurs during program execution, flushing of part or all of the program instructions currently selected in a processor's execution pipeline (containing the program instructions to be executed, or being executed) prevents the value of the index during the next eleven fetch cycles after a flush from being reliable, since the index requires the next eleven cycles for its development. Then, predictions cannot be obtained during the next eleven fetch cycles after a flush until the index development is completed, after which the index can be relied on for selecting instructions for execution, except for the case where the flush is caused by a mispredicted conditional branch instruction, for which immediate recovery is obtained in the next fetch cycle after a flush. Then, the recovered multi-cycle prediction mechanism can be providing reliable predictions immediately after a flush with no significant penalty.

Thus, the incorporated application solves the multi-cycle recovery problem for mispredicted conditional branch instructions by saving the value of the multi-cycle index used to select the conditional branch instruction (whether its misprediction indicates a mispredicted target instruction address, or a mispredicted next sequential instruction address, as the next instruction's address). The processor can then recover by using the saved multi-cycle index of the mispredicted branch instruction, since this branch instruction is the last instruction validly selected for execution when the flush is performed on all instructions selected after this branch instruction since they are in a wrong execution path for the program.

However, immediate recovery is not obtained for a multi-cycle index by the solution provided in the incorporated application when a pipeline flush is caused by an event independent of a branch instruction misprediction. Non-branch flushes can occur more frequently than flushes caused by branch mispredictions. That is, there are many causes of non-branch pipeline flushes.

If a branch prediction is being located by a multi-cycle index for an instruction in the I-cache located by the IFAR at the time of occurrence of a non-branch flush, the multi-cycle indices developed immediately thereafter (during the N number of cycles needed to develop a reliable index) are unreliable for use in selecting the next instruction. A relatively large number of conditions exist in a processor which may cause a pipeline flush. Then, an unreliable index may be provided during each of the next N fetch cycles (such as 11 fetch cycles) before the post-flush index values becomes reliable and can be used to make branch predictions for instructions located in the I-cache using the IFAR.

It is therefore the primary object of the subject invention to enable a processor to quickly recover reliable use of a multi-cycle index branch prediction mechanism when a flush occurs in the processor pipeline, whether the flush is caused by an event occurring for a non-branch instruction or for a branch instruction. Recovery of the use of the multi-cycle index prediction mechanism involves quickly restoring a GHV (global history vector) register to a steady state value, which may be disrupted when an execution facility in the processor detects a flush event for a problem instruction. This problem instruction is in a detected dispatch group in the processor execution pipeline. When the problem instruction is executed, if it is a non-branch instruction the processor execution unit signals and invalidates this detected dispatch group and all later dispatch groups in the pipeline. If the problem instruction is a branch instruction, the processor execution unit signals and invalidates all dispatch groups in the pipeline following the dispatch group that contains the branch instruction. Concurrently, the execution unit locates a branch information queue element associated with a branch instruction in the detected dispatch group, or immediately preceding the detected dispatch group if no branch instruction is in the dispatch group. (This branch instruction may or may not be the instruction causing the flush.) A GHV counter value in the queue element indicates the reliability of the associated GHV value in the same queue element. The content of a GHV register is set to a GHV value obtained from the associated branch information queue element. The GHV counter register is set to the GHV counter value in the branch information queue element if the dispatch group containing the problem instruction also contained a branch instruction. The GHV counter register is set to 0 if the dispatch group containing the problem instruction does not contain a branch instruction. If the GHV counter register value is indicated as reliable, the multi-cycle index prediction mechanism may continue to be used without interruption. But if unreliability is indicated for the multi-cycle predictions by the associated GHV counter value in the queue element, the multi-cycle predictions may then not be used until a transient period of a number of fetch cycles have occurred which are required before the GHV counter value reaches a predetermined value N (or N+1) which indicates that GHV has reached its reliable steady-state value.

This invention increases the overall accuracy of branch predictions in the system by increasing the percentage of the time during which the more accurate multi-cycle prediction process (e.g. GBHT prediction process) can be reliably used, while at the same time decreasing the percentage of time during which the less accurate single-cycle prediction process (e.g. LBHT prediction process) is used.

BRIEF DESCRIPTION OF THE DRAWINGS

The foregoing and other objects, features and advantages of the invention will be apparent from the following detailed description taken in conjunction with the accompanying drawings, which are.

DETAILED DESCRIPTION OF AN EMBODIMENT

Figure 1:
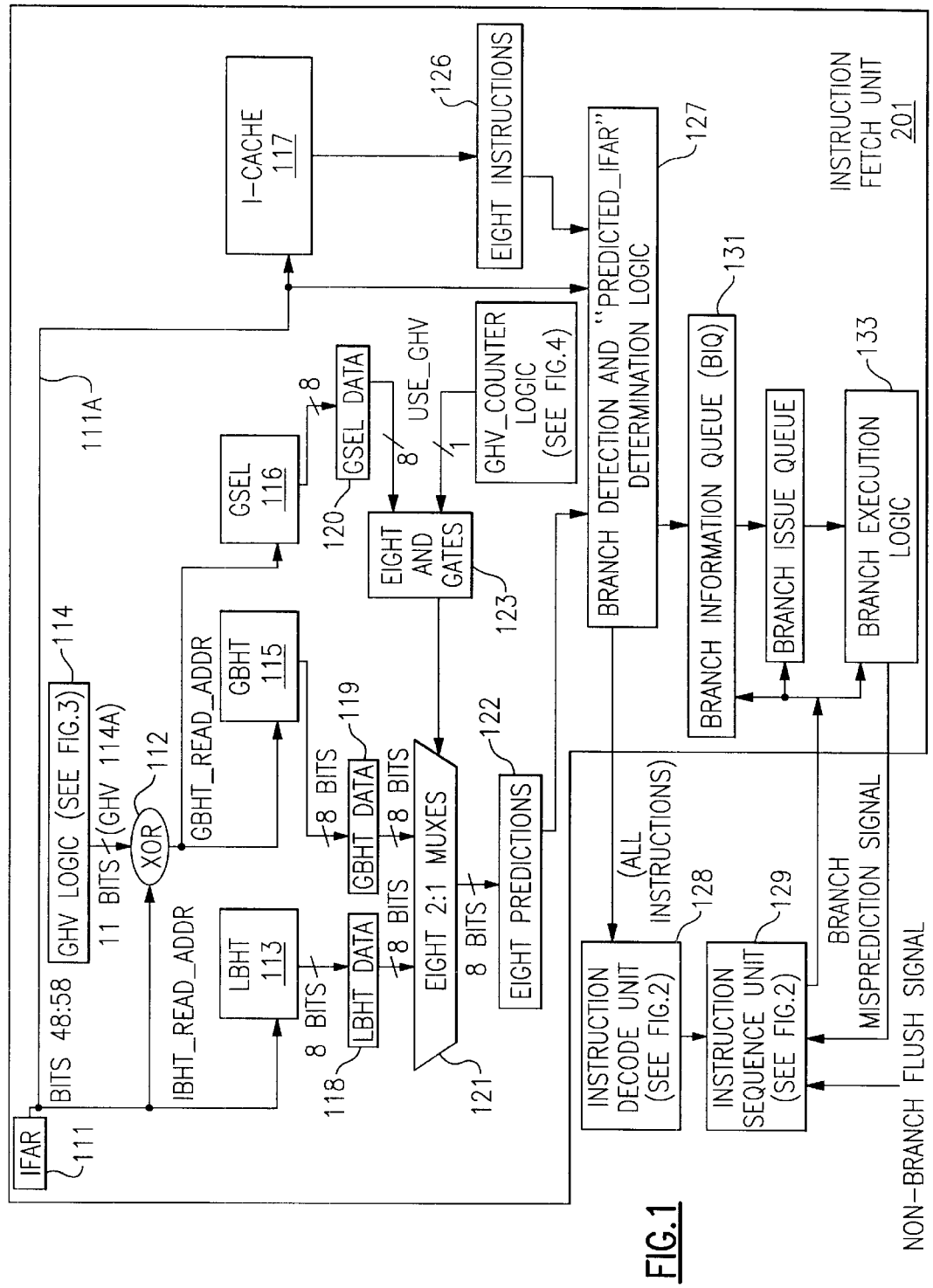
FIG. 1 is a block diagram of the Instruction Fetch Unit (IFU) used in a processor containing a preferred embodiment of the subject invention.

FIG. 1 shows an Instruction Fetch Unit (IFU) 201 used in a processor which contains an IFAR (instruction fetch address register) 111 that provides the address of each instruction required in the execution of a program currently being executed by the processor. The addresses are loaded into the IFAR in the order required for the execution of the program. The processor operations occurring for each instruction address loaded into the IFAR 111 herein are controlled by an "IFAR fetch cycle" which obtain the predictive IFAR address loaded into IFAR.

Figure 6:
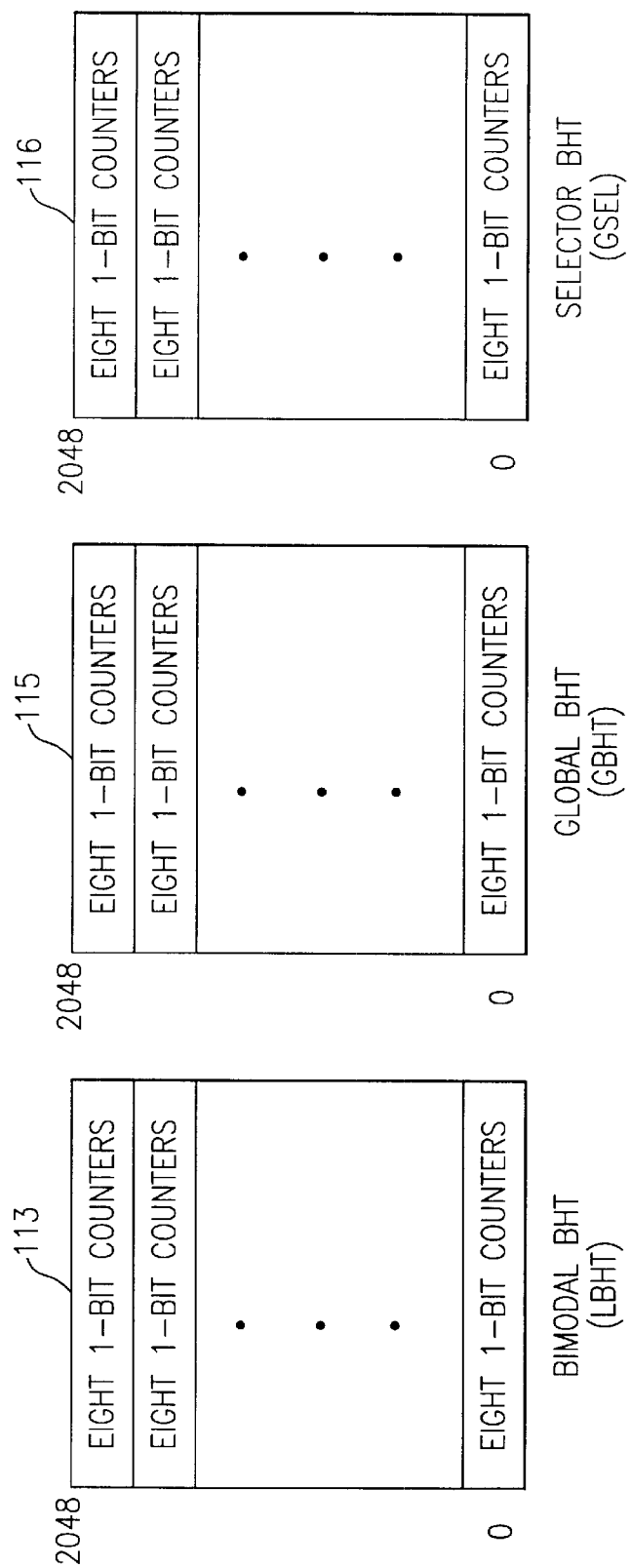
FIG. 6 represents a Local Branch History Table (LBHT), a Global Branch History Table (GBHT), and a Global Selector Table (GSEL).

The IFU 201 is driven by plural predictive processes for selecting each next instruction address to be loaded into IFAR 111. Each selected next program instruction address is loaded into IFAR in program sequence to control the execution path of any currently executing program in the processor. In FIG. 1 each next instruction address loaded into IFAR 111 is predicted by one of two different speculative processes, each predicting the instruction execution path to be followed after each branch instruction selected for execution in the program. FIG. 1 uses two speculative processes: one speculative process uses a Local Branch History Table (LBHT) 113, and it makes its next IFAR instruction address prediction in a single fetch cycle. The second speculative process uses a Global Branch History Table (GBHT) 115, and it uses the last N fetch cycles (N=11 fetch cycles in the preferred embodiment) to make each IFAR instruction address prediction. The single cycle index for table 113 is obtained from IFAR output 111A which comprises of eleven IFAR bits 48–58. A problem occurs when the circuitry generating the multi-cycle index (using a N shift GHV register) is reset and must again start a transient period of N fetch cycles before the multi-cycle process can assure that the correct multi-cycle index is obtained. FIG. 6 represents the Local Branch History Table (LBHT 113, the Global Branch History Table (GBHT) 115, and the Global Selector Table (GSEL) 116 of FIG. 1.

After the N fetch cycle transient period, the multi-cycle prediction process reaches its steady state operation during which it may be reliably used; and then during each fetch cycle, an index is generated for each table. Then respective indexes are generated and used to locate a separate prediction from each of tables 113 and 115. These indexes select from their tables 113 and 115 entries, each containing 8 prediction fields, during each fetch cycle. The indexed entries are outputted into a LBHT data register 118 and a GBHT data register 119. During the same fetch cycle, an entry is selected in I-cache 117 using the same IFAR value on output 111A which is being used in the LBHT 113. It is likely that the multi-cycle index being used in table 115 during that fetch cycle has a different value than the index in table 113. Nevertheless, each of the eight fields in registers 118 and 119 are respectively associated with each of the instructions in register 126. The initial instruction in the current fetch group (selected in the I-cache during each fetch cycle) is located by IFAR bits 59–61 in the current IFAR content. The last instruction in each current fetch group is the first taken branch in the index selected entry following the initial instruction at the IFAR bits 59–61 location, and if there is no taken branch the fetch group ends at the right-most instruction in the selected entry. There may be zero, one or plural non-taken branches in the fetch group, and non-taken branches need not be recognized when delineating a fetch group in registers 118, 119, 120 and 126.

An Exclusive-OR circuit 112 is shown connected to the GHV logic 114 in FIG. 1. This Exclusive-OR circuit is used in the generation of the multi-cycle index used in the multi-cycle prediction process. For each fetch cycle, the multi-cycle index generation process Exclusive-ORs an N bit Global History Vector (GHV) obtained from GHV logic 114 and the current N bit IFAR field 48–58 to generate the current multi-cycle index. For the fetch cycle after the shift register is shifted, a 0 bit is inputted into the shift register when the pipeline is advanced, and a 1 bit is inputted into the shift register for a taken branch prediction. Application Ser. No. 435,070 (docket number AT9-98-544) describes this process in more detail.

Figure 3:
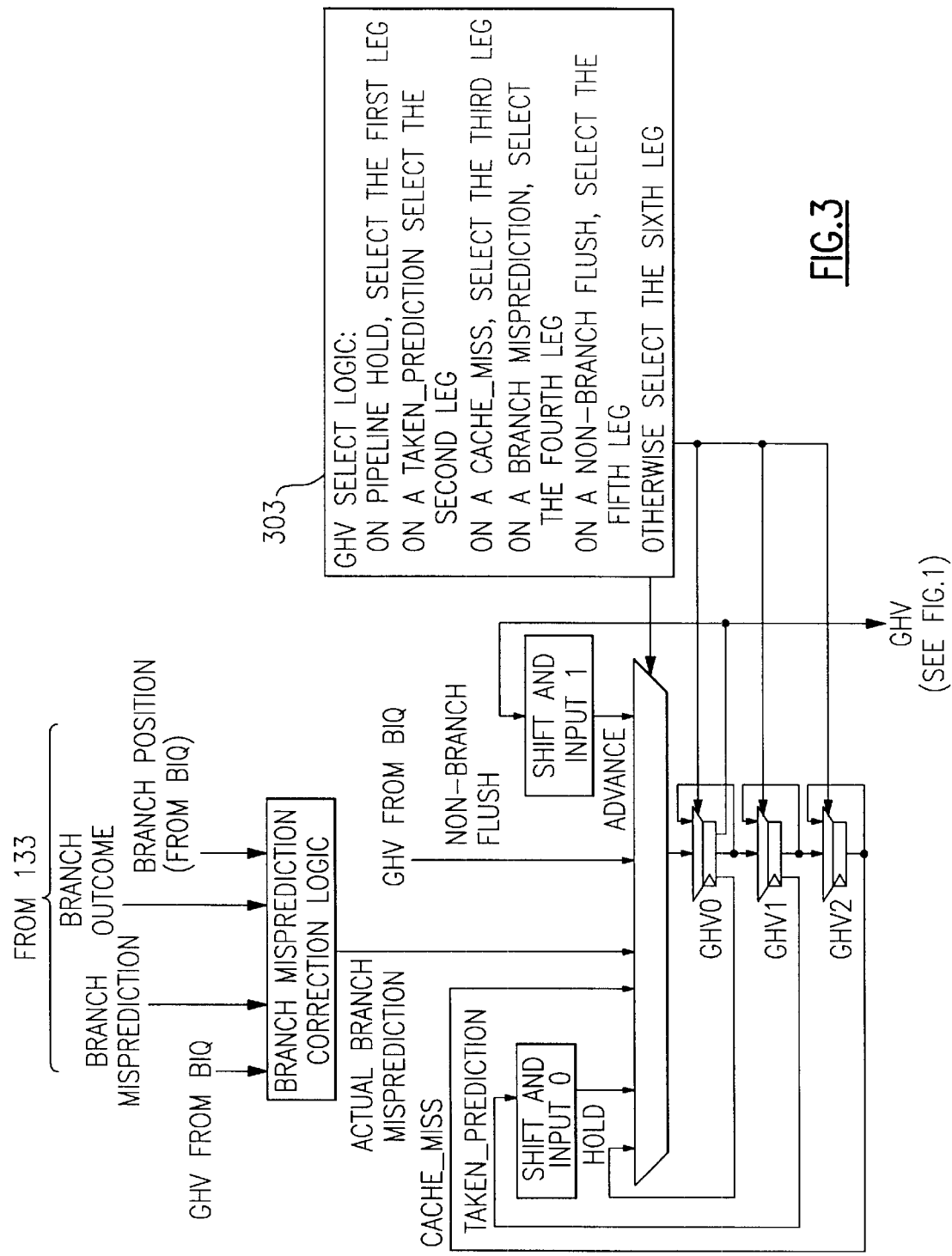
FIG. 3 shows Global History Vector circuits (GHVs) used to develop multi-cycle indices for locating currently used predictions in a fetch-based Global Branch History Table (GBHT) and Global Selector Table (GSEL) associated with currently selected instructions in an instruction cache (I-cache), when a multi-cycle index has its development disrupted by a redirection in the program's instruction stream due to any of a number of causes including a redirection caused by a non-branch instruction.

FIG. 3 shows circuits for controlling the shifting of the Global History Vector (GHV) used to develop multi-cycle indices for locating currently used predictions in a Global Branch History Table (GBHT). These predictions are associated with a currently selected fetch group of instructions in an instruction cache (I-cache). This development of the multi-cycle index may be disrupted by a redirection in the program's instruction stream due to any of a number of causes including non-branch instruction flush events and branch mispredictions.

Figure 11B:
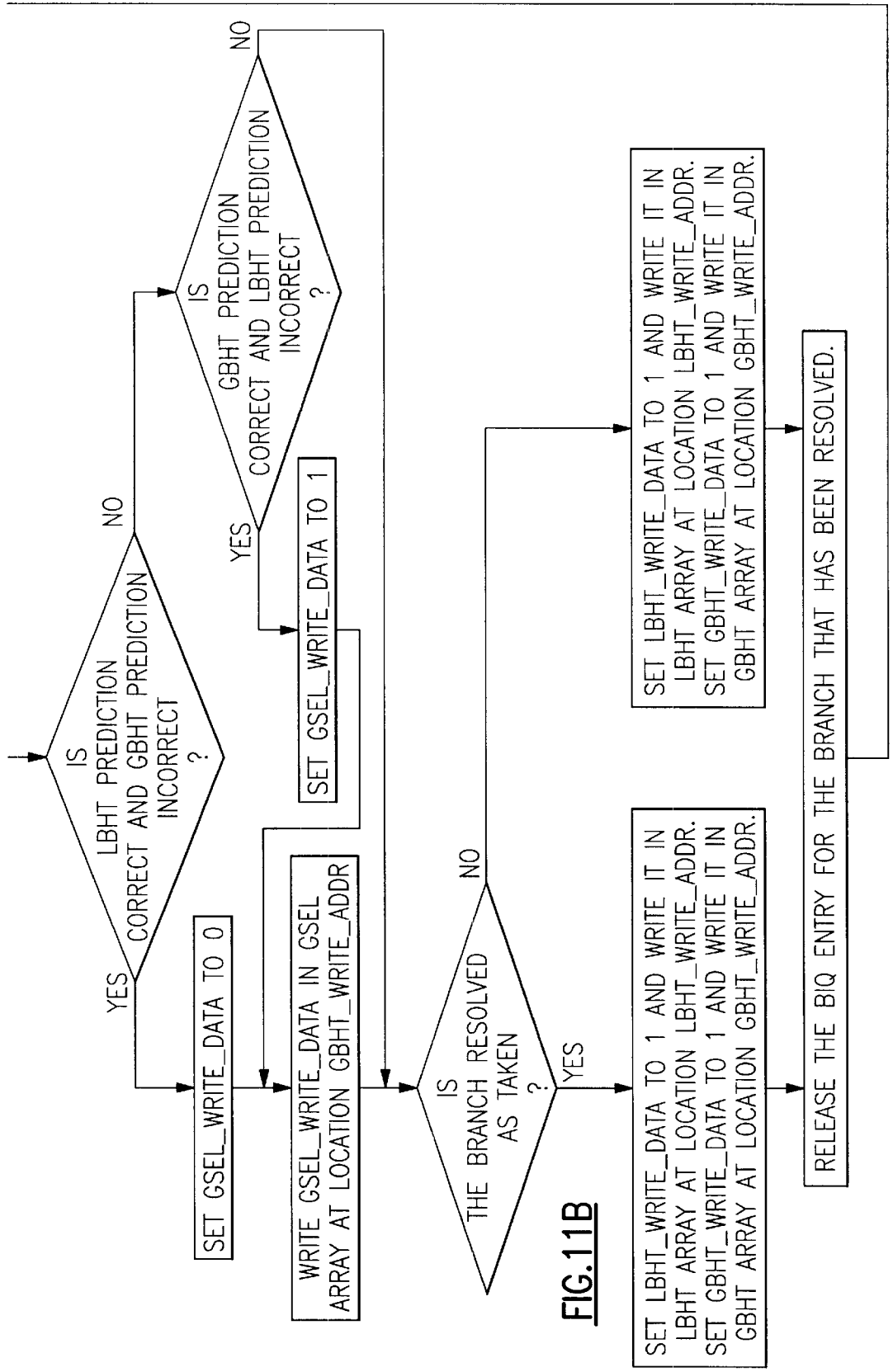
FIG. 11 is a flow-diagrams of a novel process used in the hardware of FIG. 1.

The overall prediction process in FIG. 1 uses a Global Selection Table (GSEL) 116 to obtain the best prediction currently available from either of its two prediction processes As previously stated, each of the two prediction processes develops its own index to select its own current prediction for the current program instruction being selected in a corresponding instruction field in register 126. However, the prediction in the associated prediction field is valid only if the instruction is a conditional branch instruction or an unconditional branch instruction. If the instruction is not a branch instruction, the content of the corresponding prediction field is meaningless and is not used. The flow chart in FIG. 11 describes in more detail the operations performed for writing in the GSEL array to maintain it during operation of the processor.

Accordingly, each predictive process uses a table index for selecting each next instruction to be executed in the program, whether the instruction is a branch or not. Only branch instructions can have misprediction flushes. However, flushes can occur for non-branch instructions for illegal operations which may occur in the instruction selection process, such as when load and store instructions are sequenced for execution in the wrong order, or is a dependency required by an instruction cannot be available before the instruction is executed, or if micro-instructions required in the execution of an instruction makes an illegal operation. There are a large number of conditions which can happen that may cause a flush in the pipeline for non-branch instructions. This invention is particularly oriented towards handling program execution redirections caused by flushes occurring for non-branch instructions, which may involve a different type of program redirection than is involved with branch instructions.

The multi-cycle process, on average, makes more accurate predictions than the one-cycle process. However, the multi-cycle process has the characteristic of having an index development period requiring N normal contiguous fetch cycles before the developed index can be used to reliably make a prediction in Table 115. Any flush of instructions in the processor's execution pipeline occurring during the last N cycles disrupts the contiguity of the 11 normal fetch cycles needed for obtaining a correct prediction, and is used in combination with a redirection of the program execution path. Thus, any flush occurring in the processor's execution pipeline during the last 11 fetch cycles may cause an unreliable signal which is used in the generation of the multi-cycle index needed for locating a prediction in table 115, and any prediction is unreliable when it is based on an unreliable index. Further, all subsequent predictions obtained from table 115 remain unreliable until at least 11 fetch cycles have occurred during which no pipeline flush has occurred, after which the indices remain reliable as long as no potentially unreliable signal occurs during the generation of each multi-cycle index for table 115.

Figure 5:
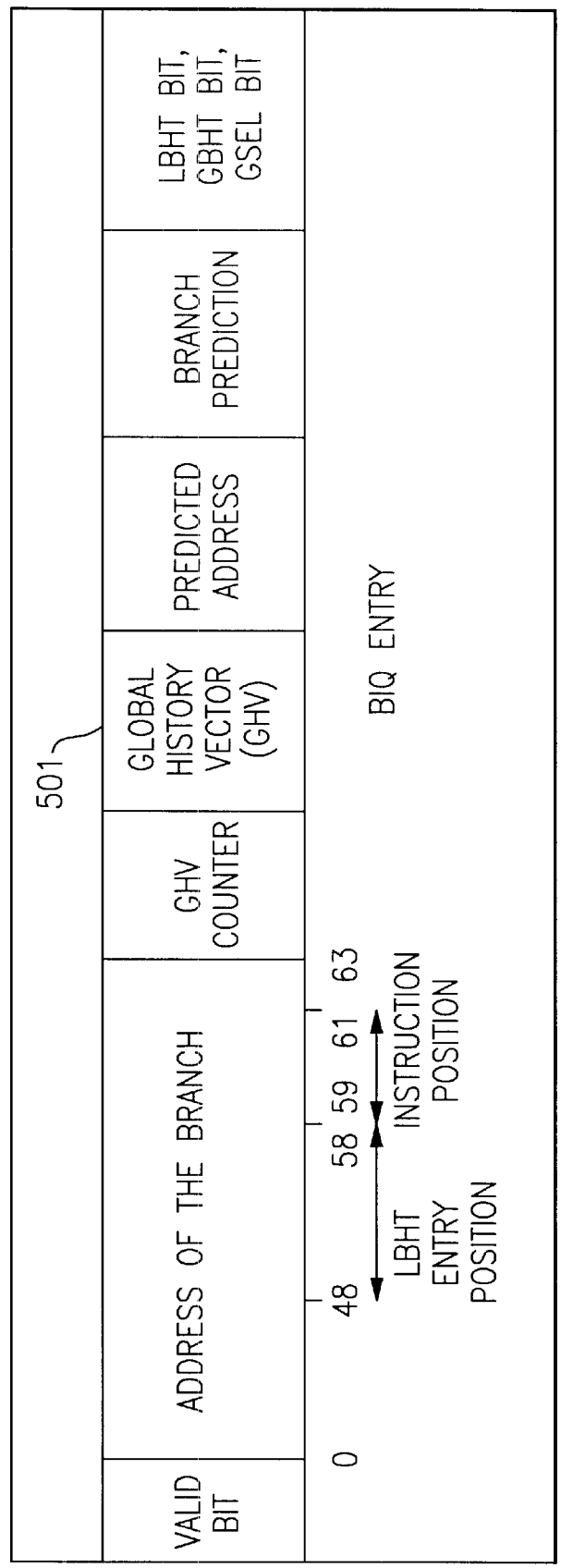
FIG. 5 represents a branch information queue (BIQ) containing novel entries used by the preferred embodiment for restoring the GHV after the occurrence of a redirection.

A set of eight multiplexers 121 make a parallel selection between the eight fields in register 118 or the eight fields in register 119, whichever is indicated to be the most reliable during the current selection cycle. This selection is made by a signal from an AND gate 123 to the multiplexer 121 which determines the prediction entry in 118 or 119 that is selected by being outputted to an eight prediction register 122. Then a particular prediction is selected in register 122 for a particular instruction in register 126 at associated positions in these registers determined by IFAR bits 59–61, which selection is made by branch detection and predicted IFAR determination logic 127, which selects all instructions in the instruction stream and sends them to an IDU (instruction decode unit) 128. Also, the determination logic 127 selects each branch instruction and generates information for a queue element in BIQ 131 which receives the information and stores it in a queue element 501 shown in FIG. 5. An invalid queue element is selected and BIQ writes therein the "address of the branch" instruction, the current "GHV counter" value, the current GHV value, the "predicted address" which may be the same as IFAR bits 59–61, the "branch prediction" which is the state of the branch prediction bit selected in register 122, and the state of the selected LBHT bit, selected GHBT bit, and selected GSEL bit. A valid bit is set to valid state when the BIQ element is completed.

In FIG. 1, the determination logic 127 selects a "fetch group" of instructions and their predictions from the selected prediction table, now in register 122 and the selected associated cache entry which is now in register 126, and sends the fetch group to the IDU 128. A fetch group comprises one or more instructions in the selected cache entry from the IFAR addressed instruction to and including the first taken branch in the cache entry, or through the last instruction in the entry if there is no preceding taken branch instruction. Thus, a fetch group can have no branch instructions or one or more branch instructions, but only the last branch instruction can be taken.

When the ISU 129 receives a "fetch group", it is parsed into "dispatch groups" in the order the dispatch group(s) are found in the fetch group. A fetch group may have more than one branch instruction, but it can have only one taken branch instruction as its last instruction, although a fetch group may not contain any branch instruction. A dispatch group can contain at most one branch instruction whether taken or not taken, and each dispatch group can not have more than five instructions in this embodiment. Therefore, a fetch group is divided into at least as many dispatch groups as there are branch instructions in the fetch group.

The dispatch groups are sent by IDU 128 to the Instruction Sequencing Unit (ISU) 129 in program execution order, and ISU 129 handles the selected instructions in their dispatch groups in which they reside in program execution order.

Figure 2:
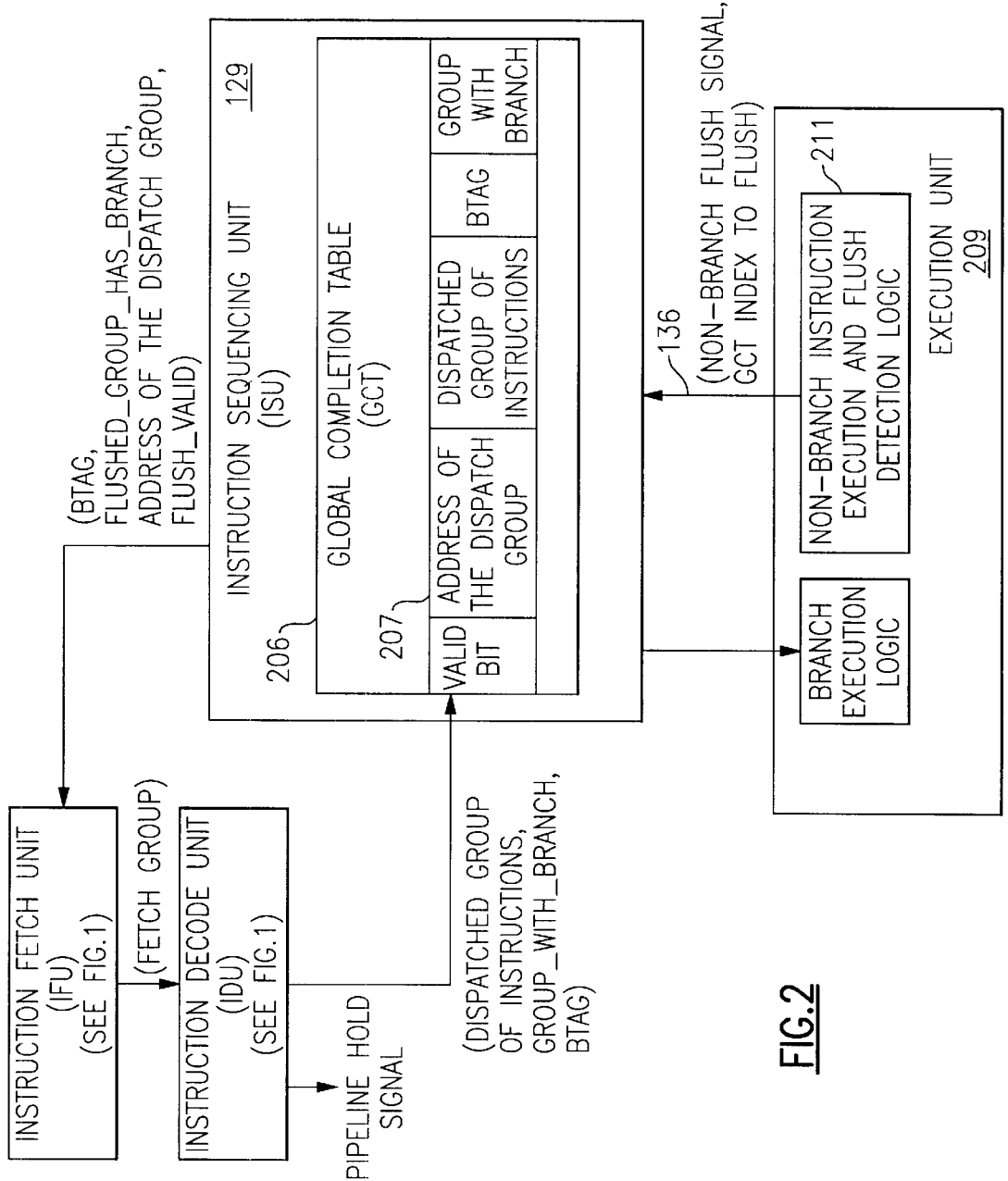
FIG. 2 is a block diagram showing the combination of the IFU, IDU and ISU used in the preferred embodiment of the subject invention.

FIG. 2 shows the Instruction Sequencing Unit 129 in more detail as containing a Global Completion Table (GCT) 206. The ISU 129 organizes each received dispatch group into a GCT element 207. The GCT element 207 contains fields including: a "address of the dispatch group" field which is the memory address of the first instruction in the group, a "dispatched group of instructions" field which contains each of the instructions in the group in program execution order, a "group with branch" field which is set to 1 if this group contains a branch instruction (whether taken or not taken) and set to 0 if no branch instruction exists in the group, and a "Btag" field which operates in combination with the setting in the "group with branch" field. That is, the "Btag" field is set to the BIQ index of a BIQ element in BIQ 131 representing any branch instruction existing in this dispatch group. But if the "group with branch" field indicates no branch instruction exists in the dispatch group, Btag is set to the BIQ index in the Btag field of the last generated GCT element (which represents the BIQ element for the closest previous branch instruction). A valid field in each GCT element indicates if the element's content is valid. It is possible for the GCT to contain a sequence of GCT elements having the same BIQ index value in each of their Btag fields when the pipeline contains a long string of non-branch instructions with no intervening branch.

Pipeline flushing is performed by invalidating all GCT elements at and after the GCT element containing an offending non-branch instruction causing the flush. When a flush event occurs for a non-branch instruction, the flush is performed by invalidating the GCT element containing that instruction and all later valid GCT elements which follow. If the dispatch group containing the non-branch instruction also contains a branch instruction then the Btag field in the GCT element containing the offending instruction is used to access the BIQ and invalidate the BIQ element located by this Btag value and all later valid BIQ elements which follow. If the dispatch group containing the non-branch instruction does not contain a branch instruction then the value in the Btag field in the GCT element containing the offending instructions is incremented by one and the incremented value is used to access the BIQ and invalidate the BIQ element located by this incremented value and all later valid BIQ elements which follow. This enables the pipeline recovery from the non-branch redirection event.

A pipeline flush is performed for a branch instruction misprediction by invalidating each GCT element after the GCT element containing the branch instruction, but the GCT element containing the mispredicted instruction itself is not invalidated. Also invalidated as part of the flush operation are all later GCT elements which follow, and each BIQ element is invalidated which is identified by the Btag fields in the invalidated GCT elements when its "group with branch" field indicates a branch instruction exists in its dispatch group.

Figure 10B:
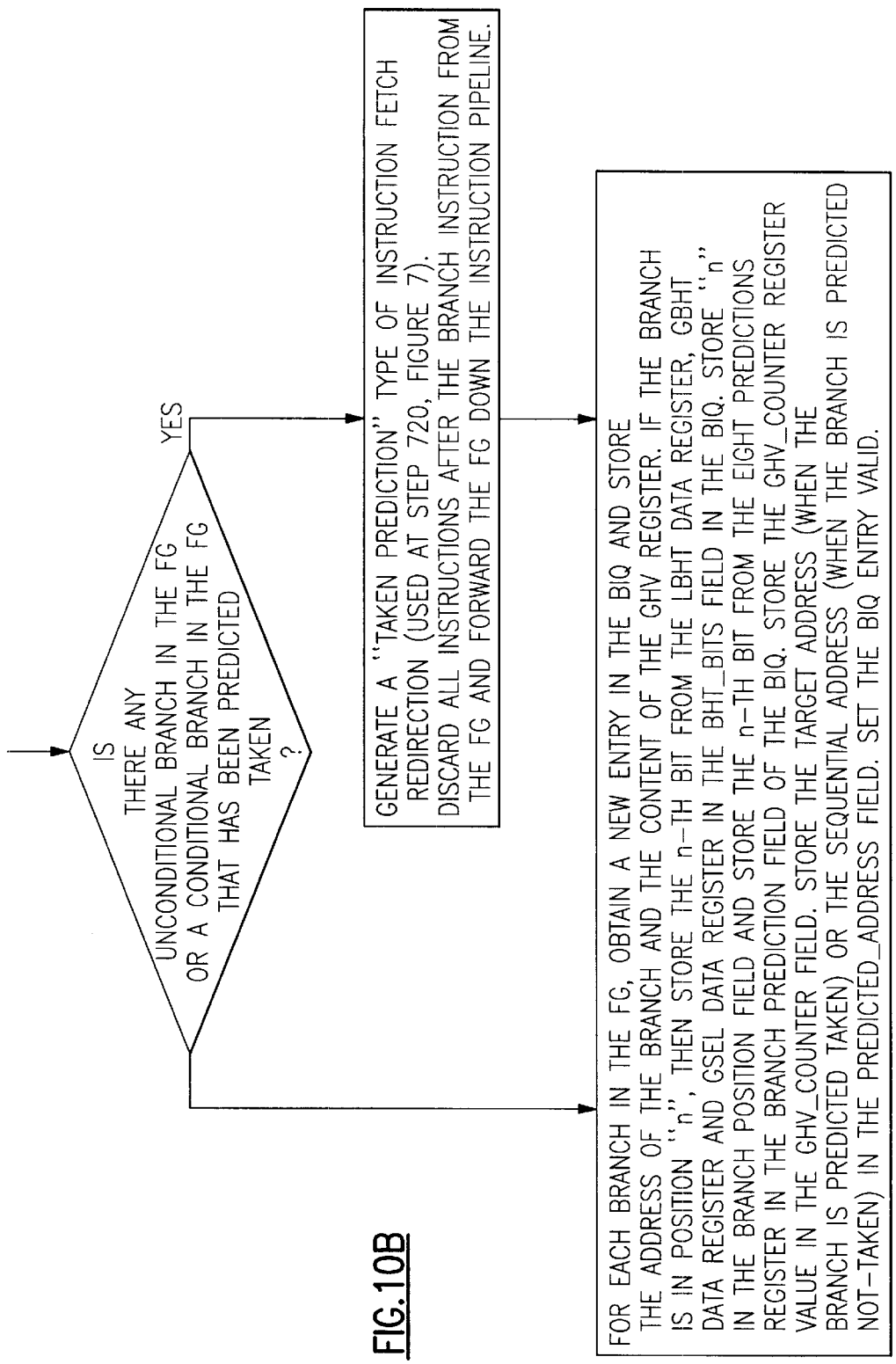
FIG. 10 is a flow-diagram of a novel process used in the hardware of FIGS. 1 and 5.

The flow chart in FIG. 10 describes the process used in the BIQ for obtaining branch predictions and for storing branch information in the BIQ elements.

ISU 129 sends its branch instructions to Branch Execution Logic 133 when they are reached for execution in the pipeline sequence, and logic 133 signals the conditions relating to the actual execution conditions regarding the executed instruction. When it is a branch instruction, the actual execution indicates whether the used prediction is correct or is a misprediction, and when logic signals a branch condition it has all needed information on that branch in an associated BIQ element. However, when it is a non-branch instruction, the execution signals conditions requiring special handling (such as special exception conditions that violate the instruction dependency rules, microcode failures during the execution, etc.) A pipeline flush may be signaled during the execution operation for a non-branch instruction when a special exception condition is determined. Unlike branch mispredictions, non-branch flush conditions do not cause the program to take a different execution path from the offending instruction, although the execution path may be restarted after being backed up by one or more flushed instructions.

Figure 4:
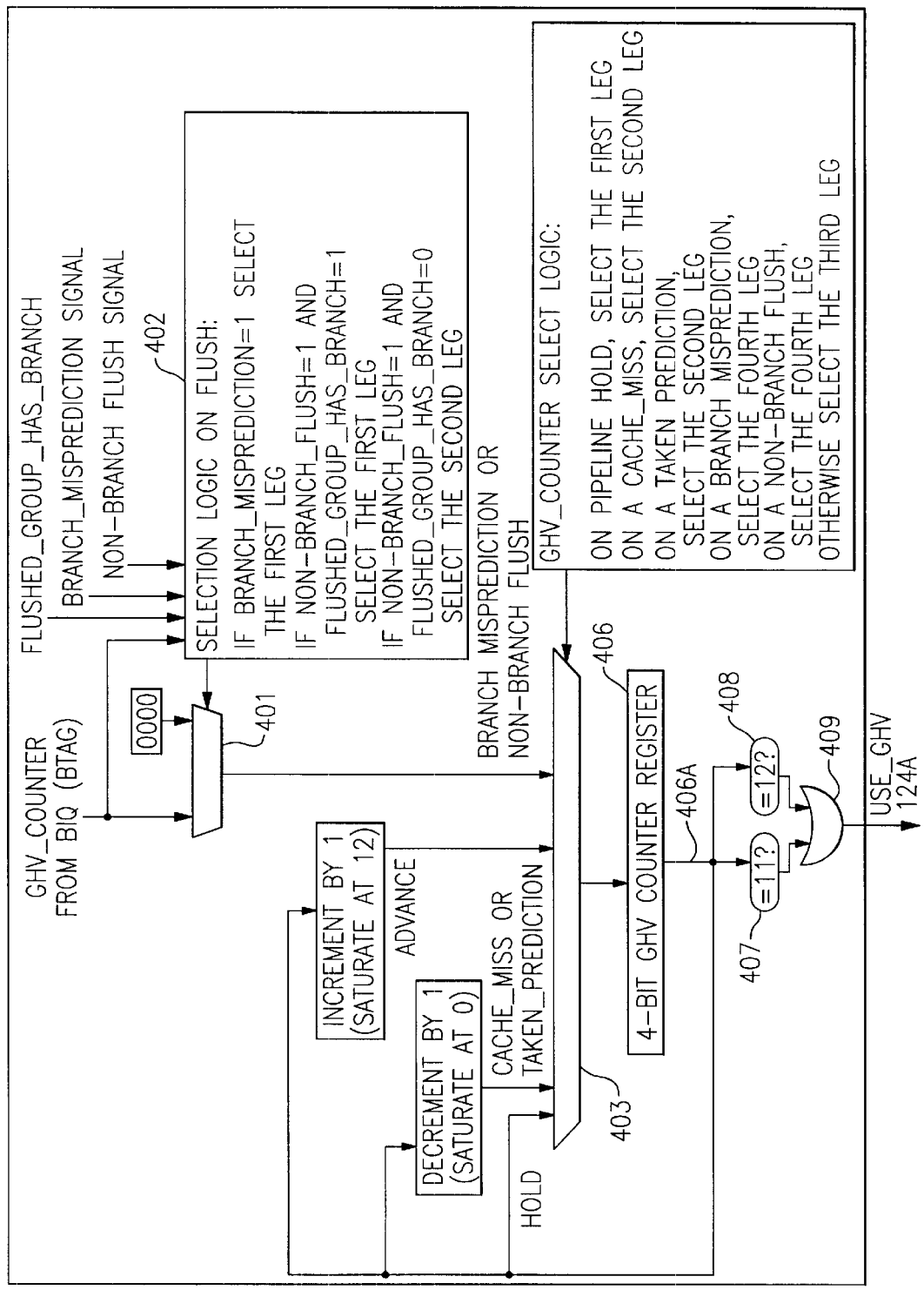
FIG. 4 shows circuits for controlling the content of a GHV counter used to indicate whether a concurrent GHV can be reliably used after the occurrence of a redirection, including a redirection caused by a non-branch instruction.

The GHV counter circuits 409 in FIG. 4 indicate when the current multi-cycle index are reliable or not reliable for making the current prediction in the GBHT 115. A "use_ghv" output 124A provides a 1 output to indicate the GBHT may make a reliable prediction, and a 0 output indicates the GBHT prediction can be unreliable when made using the current index. When the multi-cycle GBHT prediction is indicated to be unreliable, the single cycle LBHT prediction may instead be used as the current prediction of the combined prediction mechanism in FIG. 1.

When a pipeline flush occurs during the last N number of fetch cycles, the flushed fetch groups may still be represented in the N bit content of the GHV in FIG. 3, but these GHV contained bits no longer correctly represent the modified execution sequence caused by the flush, such as a back up in the instruction stream for a non-branch flush, or a new execution path for a branch misprediction. These execution changes affect the generation of the GHV count in the GHV counter register 406 (which adjusts the count for the changes in the fetch cycles) by adjusting the maximum GHV count of N+1 for back ups and advances in the instruction stream and will make the count less than N when the use of the GHV content is suspect in the index generation process and therefore unreliable.

The 4 bit GHV counter 406 provides a count on its output 406A of the fetch groups sent to the pipeline. Counter 406 saturates at count 12 which is its maximum count value when incremented by a positive value, such as +1, and saturates at count 0 which is its minimum count value when decremented by a negative value, such as −1. The saturated count 12 occurs when the GHV has reached its steady state operation after N=11 of normal fetch cycles, and is set to count 0 when an event occurs which is known to make the current count unreliable. The circuits in FIG. 4 adjust the saturated count 11 or 12 on 406A downward to an unreliable value of less than 11 for non-branch flushes and for branch mispredictions that makes the GHV value unreliable. Thus, the current count on 406A indicates if the current GHV value (in FIG. 3) is reliable or not. Thus, the reliable GHV count of 11 or 12 occurs when the GHV has received 11 or more fetch groups (its maximum number). The 12 count is one more than the maximum number of 11 and is used as the saturation count, so either value 11 or 12 (shown in boxes 407 and 408) indicates the GHV has reached its reliable state. Any GHV count less than 11 may indicate the unreliable state for the GBHT index. The counter is forced to a count of zero whenever a flush event occurs which makes all of the GHV bits unrecoverable.

However, this invention has discovered how in some circumstances the GHV content may be made immediately usable and reliable without having to wait for an N fetch cycle period when some types of flushes occur. This is done by detecting recoverable conditions, such as when a flush occurs for a non-branch instruction in a dispatch group having a branch, or when a misprediction occurs for a branch instruction. However a non-recoverable condition occurs if a flush occurs for a non-branch instruction in a dispatch group not having a branch instruction, and then the GHV count is set to zero. Recoverable conditions are verified for the GHV value captured in a determined BIQ element when its simultaneously captured GHV count indicates the reliable count of N (or N+1), and then the GHV value is reliable and may be used for immediate recovery. However, if the captured GHV count indicates a value less than N then the GHV value is not reliable and cannot be used for immediate recovery. The recovery process requires the remaining number of fetch cycles between the captured GHV count and N.

In the case of a non-branch flush, the recovery detection process finds a BIQ element associated with the branch instruction (if any) in the first dispatch group that is flushed. The first instruction in this first dispatch group is where execution starts after the flush in the pipeline, and therefore the captured GHV value for the branch instruction was not changed by the flush. This circumstance is found if the non-branch instruction that caused the flush is in the same dispatch group as the branch instruction.

In the case of a branch misprediction, the recovery detection process finds a BIQ element associated with the mispredicted branch instruction. The mispredicted branch instruction is not part of the instruction stream that is flushed and is prior to where execution starts after the flush in the pipeline. Therefore the captured GHV value for the branch instruction was not changed by the flush, although the captured GHV value needs to be updated to reflect the actual outcome of the mispredicted branch because the captured GHV value reflects the predicted outcome of the mispredicted branch. Although the execution path is changed, the mispredicted branch instruction itself is not flushed and it is still associated with its unchanged captured GHV value in its BIQ element. The GHV count then determines if the captured GHV value can be used for an immediate recovery.

Figure 7B:
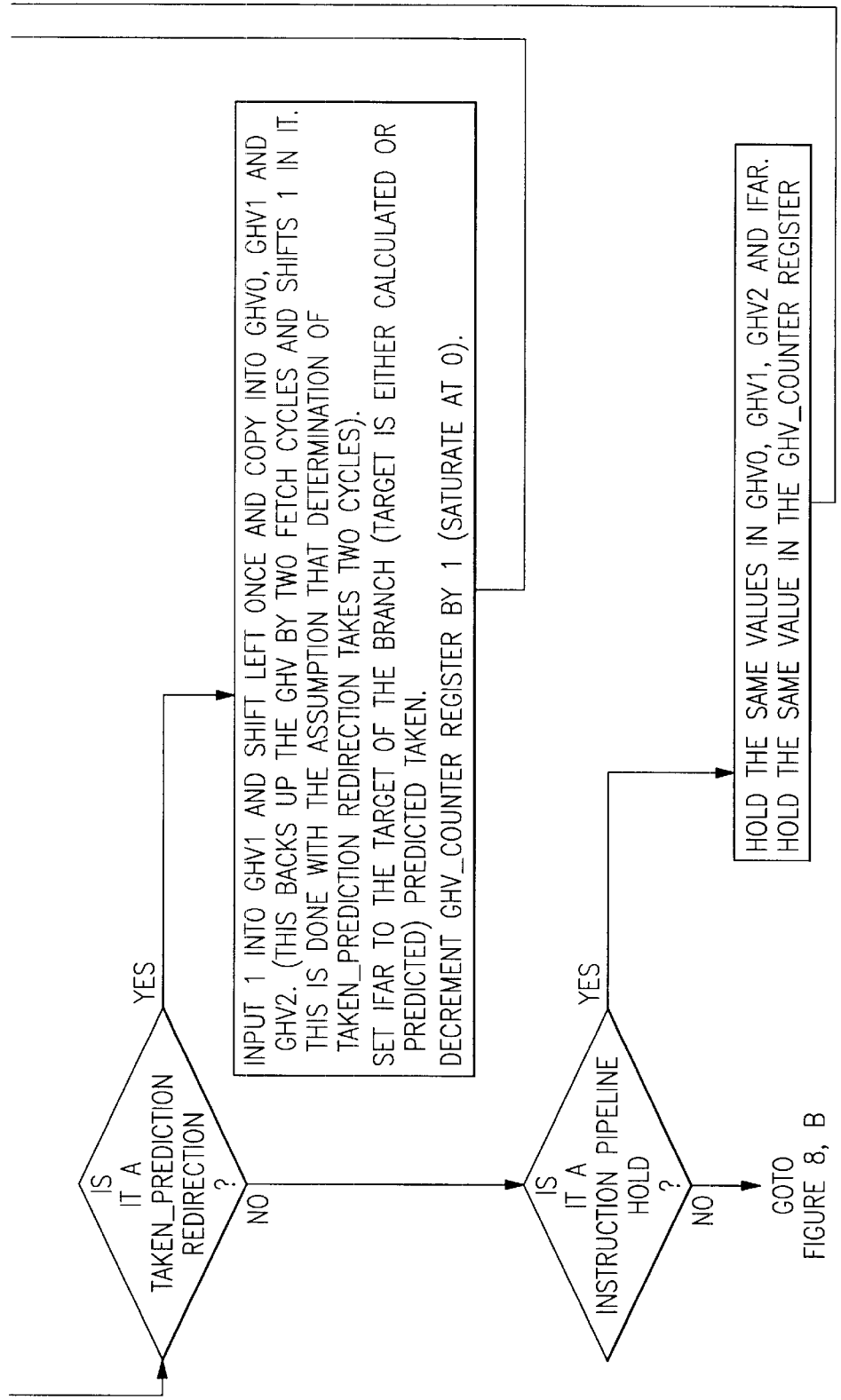
FIGS. 7, 8 and 9 are flow-diagrams of novel processes used in the hardware of FIGS. 2, 3, 4 and 5.

For these reasons, the GBHT prediction obtained from table 115 is indicated to be unreliable due to an unreliable captured GHV count and for the remaining number of fetch cycles between the captured GHV count and N, the GBHT prediction mechanism may not be used. For these remaining fetch cycles the single-cycle LBHT predictions from table 113 may instead be used. The flow diagram in FIG. 7 shows the detailed process used by the GHV counter in FIG. 4.

Application Ser. No. 09/435,070 AT9-98-544 (incorporated herein) discloses a branch prediction process which chooses between predictions by the multi-cycle process and by the single-cycle process to increase the reliability of the predictions used for selecting instructions for execution. Recovery for mispredictions causing a pipeline flush is also disclosed therein. The present application discloses and claims multi-cycle prediction recovery from pipeline flushes caused by non-branch instructions. In application Ser. No. 09/435,070 AT9-98-544, branch-misprediction recovery is enabled by saving a current GHV (global history vector) value in an element in a Branch Information Queue (BIQ) 131 for each conditional branch instruction selected in an I-cache 117 for execution by the processor. The information for each selected conditional branch instruction is stored in a BIQ element 501 shown in FIG. 5. This invention adds a "GHV counter" field in each BIQ entry to enable it to indicate whether the GHV field contains a reliable value. In this embodiment, a count of 11 or 12 must be in the "GHV counter" field for the GHV field to contain a reliable value. If the GHV counter has a value less than 11, the GHV register value cannot be reliably used because this GHV was not developed using a complete set of 11 normal fetch cycles. The GHV counter in FIG. 4 controls the count set into the BIQ element to indicate an unreliable value when the multi-cycle index is unreliable.

This invention provides the novel "GHV count" field in each BIQ element to indicate the reliability of the content of the "Gobal History Vector" field in the same BIQ element when it is indicated valid.

The selection process by multiplexer 121 is also controlled by GHV counter logic 124 which is shown in detail in FIG. 4, from which a "use ghv" signal is provided as an input to AND gate 123 to control the selection of the prediction output in the LBHT data register 118 (containing predictions using single cycle indices) or the GBHT data register 119 (containing predictions using multi-cycle indices). On a pipeline hold condition, it selects the hold feedback signal which merely sets the same value back into the 4-bit GHV counter register 406, so it does not change the counter setting; and therefore a previous setting (count from 0 to 12) remains. An I-cache miss condition causes the pipeline to backup by two cycles because of the timing of this condition, and this decrements the counter value by 1; therefore if a previous counter value of 11 is decremented, the counter register output is changed from a "use_ghv" signal to a "do not use_ghv" signal. Likewise, a "taken_prediction" condition causes the pipeline to backup by two cycles because of the timing of this condition, and this also decrements the counter value by 1; therefore if a previous counter value of 11 is decremented, the counter register output is changed from a "use_ghv" signal to a "do not use_ghv" signal to AND gate 123, which has its output cause multiplexers 121 to allow selection of the LBHT data register 118 output. If a previous counter value of 12 is decremented by 1 due to an I-cache miss condition or a taken_prediction condition, the counter register output remains a "use_ghv" signal to AND gate 123, which has its output cause multiplexers 121 to allow selection between the LBHT data register 118 output and the GBHT data register 119 output based on whether the GSEL data register 120 output is 0 state or 1 state, respectively.

However, a "branch_misprediction" condition causes a saved recovery GHV counter value to be set into the GHV counter register, which overlays the previous setting in GHV counter register 406 to allow the multi-cycle predictions to continue to be used. This is done by selection logic 402 selecting its left-most input which provides the "GHV counter" field content in the BIQ element located by a Btag field value in a GCT entry, which sets the saved "GHV counter" field content in the BIQ element to be set into the counter register 406, which allows continued use of the multi-cycle GBHT entries if the saved counter field indicates a reliable count of 11 or 12.

A "non-branch flush" condition arising from the execution of a instruction that does not belong to a dispatch group containing a branch instruction, causes an unreliable indication of all zeros to be set into the GHV counter register, which destroys the previous setting in the GHV counter register 406 and replaces it with zero to indicate the current GHV is totally unreliable at this time. This is done by the selection logic 402 selecting the all-zeros input to multiplexer 401, and the GHV counter selector logic 404 selecting the all-zeros output of multiplexer 401 to pass by multiplexer 403 into counter register 406, which disables the use of multi-cycle predictions in the current instruction cycle.

For a cache miss in this embodiment, the pipeline is backed up by two instruction cycles, because of the timing of execution process for an I-cache miss, and the counter register 406 is decremented its counter value by 1. Therefore if a previous counter value of 11 is decremented, the "GHV counter" output 124A changes from a "use-ghv" signal to a "do not use-ghv" signal to AND gate 123, which causes the output of multiplexers 121 to select the LBHT data register 118 output. However, if a previous counter value of 12 is decremented by 1, the GHV counter" output 124A remains a "use-ghv" signal to AND gate 123, which causes the output of multiplexers 121 to select between the LBHT data register 118 output and the GBHT data register 119 output based on whether the GSEL data register 120 output is 0 state or 1 state, respectively.

For other types of conditions, selector 404 causes multiplexer 403 to increment the GHV count by +1.

Each branch instruction in the pipeline is actually executed by the "instruction execution and non-branch flush detection logic" 209 (shown in FIG. 2) when it is reached for execution in the pipeline, and its actual execution happens many cycles after it is put into the pipeline sequence in ISU 129. Instruction logic 209 includes the branch execution logic 133 (shown in FIG. 1) and "non-branch flush detection logic" 211. If actual execution by logic 209 finds a non-branch instruction has encountered a flush event, a flush signal is provided on output 136 to the ISU 129 and instructions are flushed from the pipeline starting with the instructions in a dispatch group in a GCT element containing the offending instruction and all instructions in later generated GCT elements. If actual execution by logic 133 finds a branch instruction has been mispredicted, a flush is done in the pipeline starting with the GCT element immediately following the OCT element containing the offending branch instruction and all instructions in later generated OCT elements. Although a flush is made substantially after the offending instruction is put into the pipeline, the multi-cycle prediction process has a significant likelihood of being restored so that it can continue reliable predictions without an unreliable transient period being caused by the flush event.

As a consequence, this invention increases the overall accuracy of branch predictions in the system by increasing the percentage of the time during which the more accurate multi-cycle prediction process (e.g. GBHT prediction process) can be effectively used, while at the same time decreasing the percentage of time during which the less accurate single-cycle prediction process (e.g. LBHT prediction process) is used which is only at times when the multi-cycle prediction process is indicated to be less accurate.

In more detail, application Ser. No. 09/435,070 AT9-98-544 teaches a multi-cycle prediction process (GBHT) which generates each multi-cycle index over the last 11 consecutive fetch cycles without a redirection. Each generated multi-cycle index is used to locate a prediction field in the GBHT which contains a prediction for an associated instruction being addressed in an I-cache by the current IFAR address. The multi-cycle index is generated by Exclusive-ORing the current eleven-bit IFAR field (from IFAR bit 48 through IFAR bit 58) with the current eleven bit content of the GHV. This index is reliable only if the current eleven bit content of the GHV is reliable. The process is complicated by the GHV being shifted after each bit is inputted to it, which is done on each fetch cycle, in which its content is shifted one position to the left and a 0 or 1 bit inputted into the right-most position of the shift register, depending on the type of event that occurred during the current cycle. Initially, the GHV shift register is empty, and therefore it takes eleven fetch cycles to fill all position in the GHV, and these eleven fetch cycles are required to be in the GHV before it is ready to be reliably used in an Exclusive-OR operation to generate the current multi-cycle index.

Figure 8B:
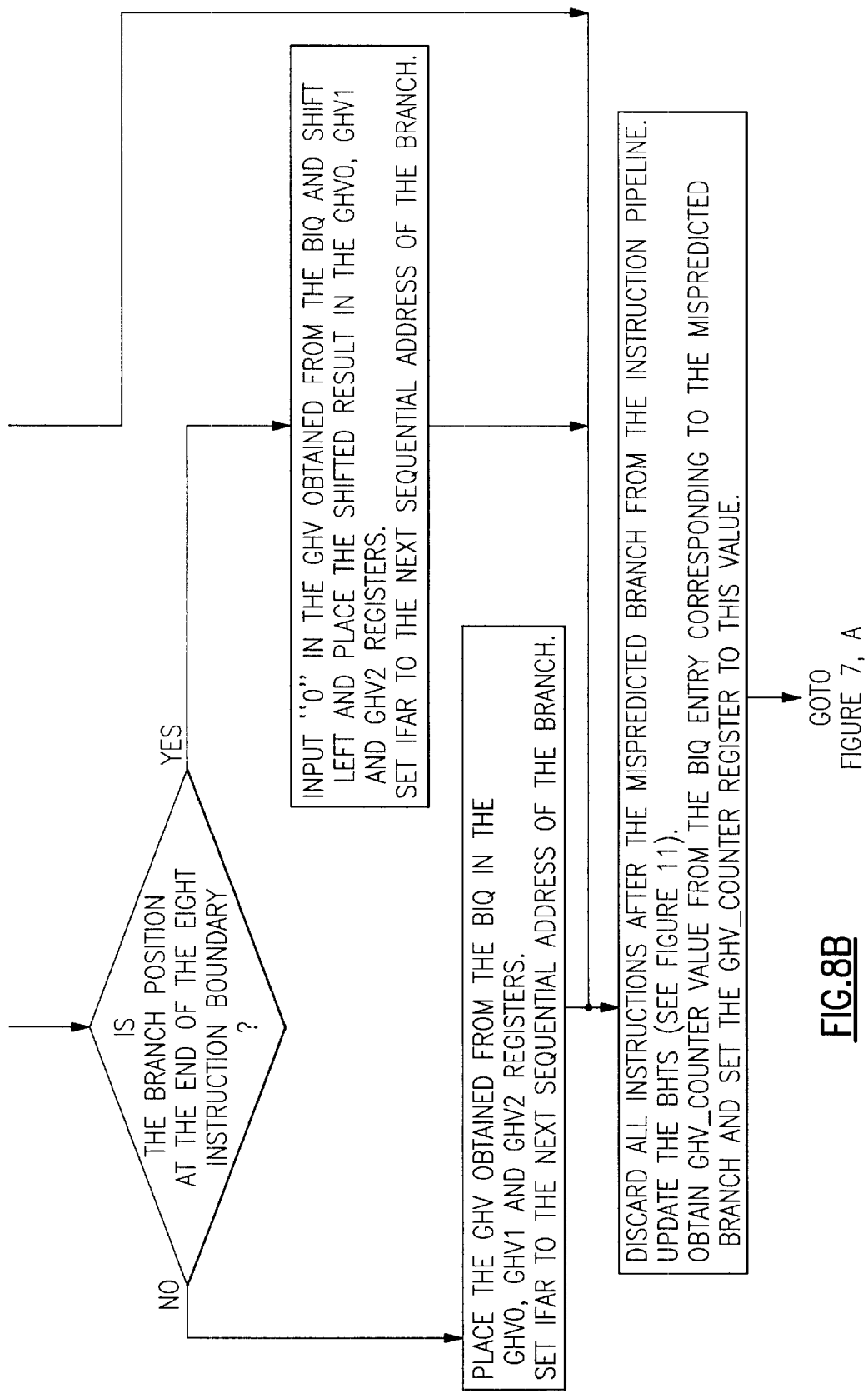
Figure 9:
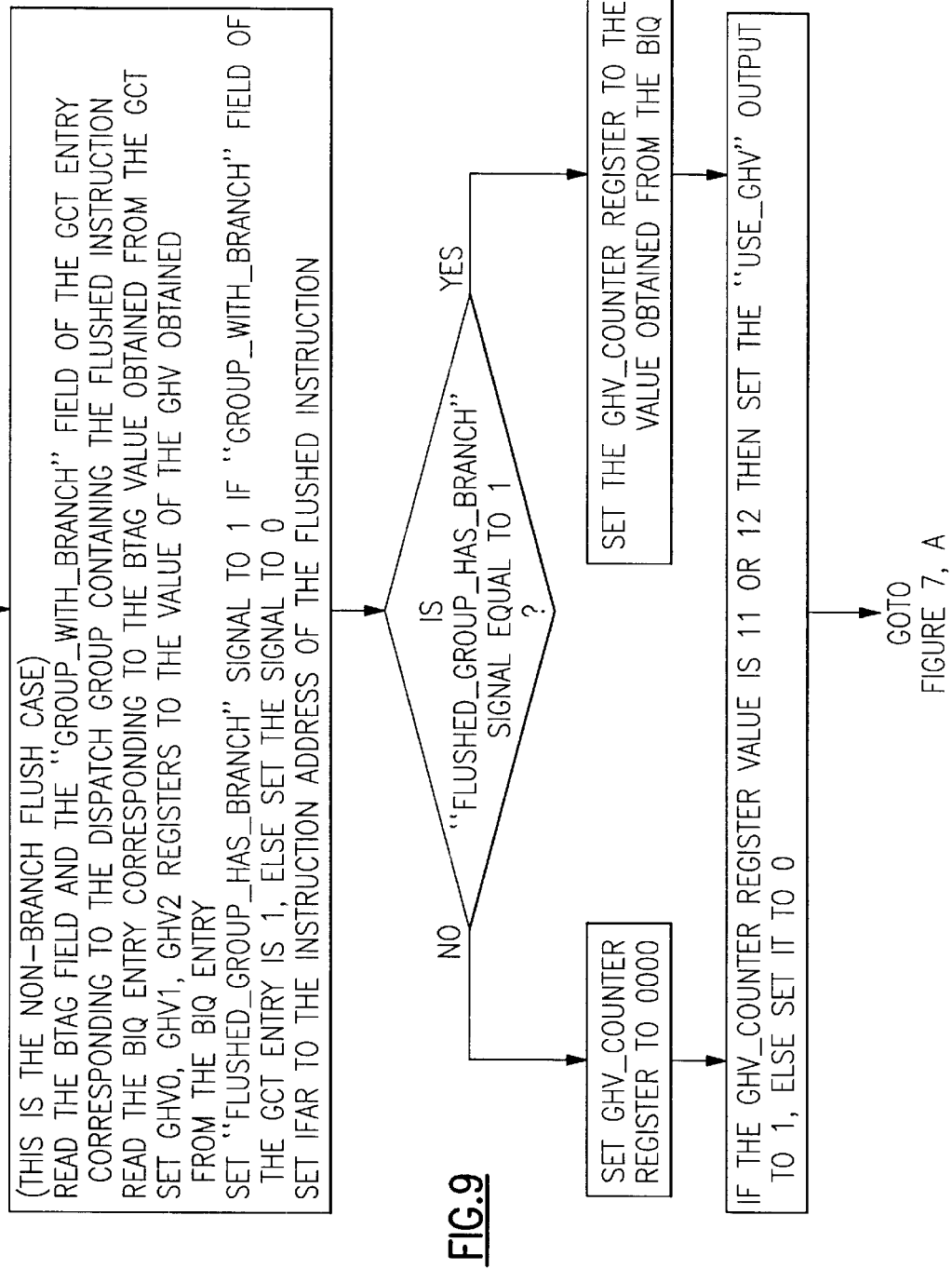

The flow charts in FIGS. 7, 8, and 9 describe in more detail the operations for obtaining recovery of the multi-cycle prediction process. FIG. 8 describes the use of the GHV counter and GHV value for recovering prediction reliability after multi-cycle branch mispredictions, and FIG. 9 describes the use of the GHV counter and GHV value for recovering prediction reliability after non-branch flushes.

While I have described the preferred embodiment of my invention, it will be understood that those skilled in the art, both now and in the future, may make various improvements and enhancements which fall within the scope of the claims, which follow. These claims should be construed to maintain the proper protection for the invention first disclosed here.

The invention claimed is:

1. Enabling reliable multi-cycle branch prediction index generation for a multi-cycle prediction process through a flush of program instructions from a processor's execution pipeline, comprising capturing in a queue element a vector value currently in a vector generator used in a multi-cycle prediction process for locating a branch prediction in a prediction table maintained by the process while an associated program branch instruction is being accessed in a cache, writing in a pipeline table a pipeline element, a dispatch group of instructions, including the branch instruction, and a non-branch instruction, and writing in the pipeline element a reference to the queue element storing the captured vector value for the branch instruction, detecting a flush event for the non-branch instruction contained in the pipeline element, obtaining the reference to the queue element in the pipeline element, and accessing the queue element, copying the captured vector value from the queue element to the vector generator for immediate use in the multi-cycle process to enable the multi-cycle process to continue making reliable predictions regardless of the occurrence of the flush, and performing a flush of instructions from the execution pipeline beginning with the dispatch group containing the non-branch instruction.

2. Enabling reliable multi-cycle branch prediction index generation for a multi-cycle prediction process through a flush of instructions from a processor's execution pipeline as defined in claim 1, further comprising generating a vector count for the vector value being generated in the vector generator for use in locating predictions in the multi-cycle prediction process, adjusting the vector count for flush changes and advances in the pipeline to indicate a vector reliability count, and capturing the vector count and the vector value in a queue element provided for each branch instruction when the branch instruction is entered into the pipeline.

3. Enabling reliable multi-cycle branch prediction index generation for a multi-cycle prediction process through a flush of instructions from a processor's execution pipeline as defined in claim 2, further comprising reading the captured vector count when the captured vector value is copied from the queue element to the vector generator, and permitting the captured vector value to be used as the current vector value in the vector generator only if the flush is due to a branch misprediction or the first dispatch group flushed contains a branch instruction, and resetting the current vector count to an initial state value when the flush is due to a non-branch instruction and the first dispatch group flushed not contain a branch instruction.

4. Enabling reliable multi-cycle branch prediction index generation for a multi-cycle prediction process through a flush of instructions from a processor's execution pipeline as defined in claim 2, further comprising setting the initial state value to zero, and setting a saturated vector count to N to represent the number of contiguous normal fetch cycles required for the multi-cycle prediction process to reach a steady state, which allows reliable predictions to be obtained by the multi-cycle prediction process.

5. Enabling reliable multi-cycle branch prediction index generation for a multi-cycle prediction process through a flush of instructions from a processor's execution pipeline as defined in claim 2, further comprising operating a single-cycle prediction process simultaneously with the multi-cycle prediction process, using predictions obtained by the multi-cycle prediction process when its predictions are indicated to be reliable, including reliable indications indicated by captured vector counts used for flushes caused by non-branch instructions and branch instructions, and alternatively using predictions provided by the single-cycle prediction process when predictions provided by the multi-cycle prediction process are indicated to be unreliable.

6. Operational flush recovery hardware in a processor having a multi-cycle prediction process, comprising a multi-cycle branch prediction determination mechanism (multi-cycle prediction mechanism) including a global branch prediction table (GBHT) for containing predictions of the outcomes of branch instructions being simultaneously selected in entries in an instruction cache (I-cache) for execution in a program, multi-cycle branch prediction index generation circuits comprised of a Global History Vector (GHV) for generating a multi-cycle branch prediction index value used to access a prediction in the GBHT for predicting the outcome of any branch instruction being simultaneously selected in the I-cache, the reliability of each multi-cycle prediction, as accessed by the generated multi-cycle branch prediction index, utilizes N number of most recent fetch cycles in the I-cache without the occurrence of a pipeline flush, a BIQ (branch information queue) generating a BIQ element for each branch instruction selected by the multi-cycle prediction mechanism, each BIQ element having a GHV value field and a GHV count field for respectively capturing a GHV value and a GHV count existing at the time the branch instruction is fetched and sent to the processor's execution pipeline, GCT elements of a global completion table (GCT) in an execution pipeline receiving fetch groups of instructions selected in program execution order in a selected cache entry, each GCT element containing: a dispatch group of instructions obtained from a received fetch group, an address of the dispatch group, an indication of whether any branch instruction exists in the dispatch group, a btag for locating any BIQ element for any branch instruction in the group or locating the most recent BIQ element for a branch instruction if no branch instruction exists in the dispatch group, and a validity indication of whether the content of the GCT element is valid, execution logic for executing the instructions in the pipeline and for signaling whenever any special exception exists for any instruction being executed in a GCT element requiring a flush of some or all GCT elements currently in the pipeline to flush the instructions contained in the flushed GCT elements and identifying the dispatch group having the instruction causing the flush, and overlaying the current GHV value in the multi-cycle branch prediction index generation circuits with the GHV value captured in the GHV value field in a BIQ entry selected by the btag in the GCT element containing a branch instruction when the flush is caused by either a non-branch instruction or the single branch instruction in the GCT element to enable the next fetch cycle to be performed by the multi-cycle prediction mechanism.

7. Operational flush recovery hardware in a processor having a multi-cycle prediction mechanism as defined in claim 6, further comprising a single-cycle prediction mechanism simultaneously operating to make predictions while the multi-cycle prediction mechanism is making predictions for the same branch instructions, a reliability indication mechanism for selecting a prediction for each branch instruction fetched in the I-cache by using a reliability indication for selecting the most reliable prediction of the predictions being simultaneously provided by both the single-cycle prediction mechanism and the multi-cycle prediction mechanism, GHV counter logic circuits overriding the reliability indication to select the prediction from the single-cycle prediction mechanism for the next fetch cycle when the selected BIQ element contains a GHV count indicating the multi-cycle prediction accessed by the captured GHV value is unreliable.

8. Operational flush recovery hardware in a processor having a multi-cycle prediction mechanism as defined in claim 7, further comprising the GHV counter logic circuits overriding the reliability indication to select the prediction from the single-cycle prediction mechanism for the remaining number of fetch cycle between the captured GHV count and N until normal operation of the multi-cycle prediction mechanism restores its reliability.

9. Operational flush recovery hardware in a processor having a multi-cycle prediction mechanism as defined in claim 7, further comprising the GHV counter logic circuits overriding the reliability indication to select the prediction from the single-cycle prediction mechanism by setting the GHV counter to 0 when the dispatch group in GCT element does not contain any branch instruction.

* * * * *